No. 764,877. PATENTED JULY 12, 1904.
A. ANDERSON.
AUTOMATIC RELIEF VALVE.
APPLICATION FILED APR. 1, 1904.
NO MODEL. 2 SHEETS—SHEET 1.

WITNESSES
INVENTOR
Alexander Anderson
BY
ATTORNEYS

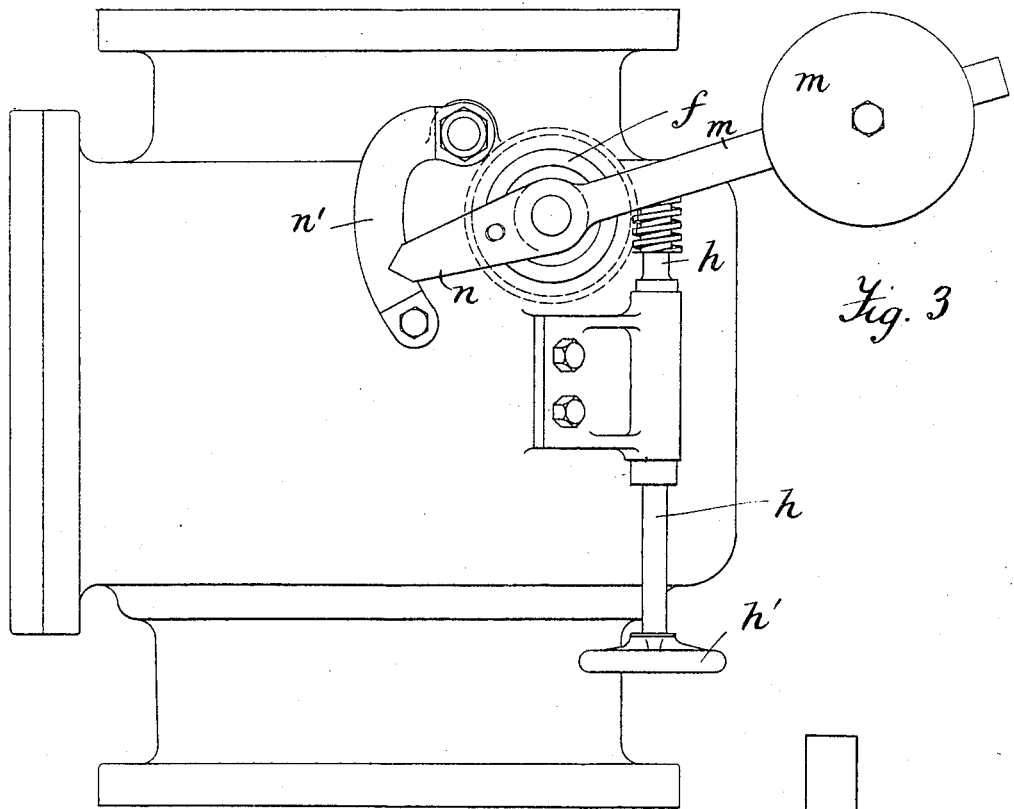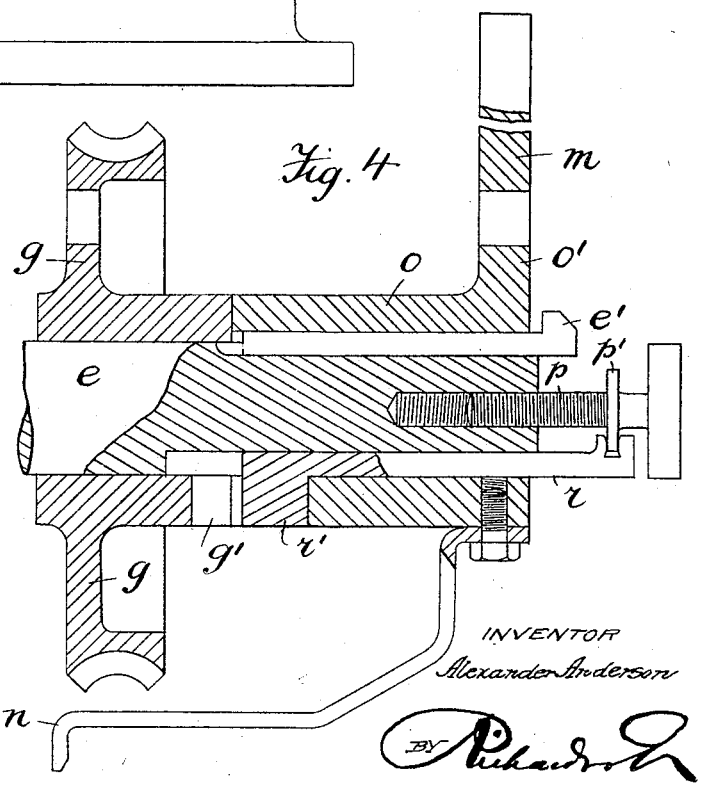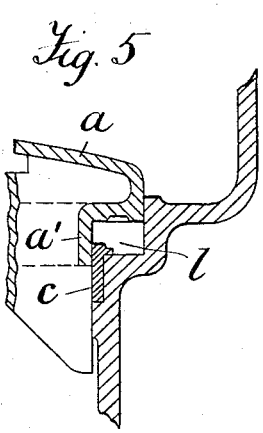

No. 764,877. Patented July 12, 1904.

UNITED STATES PATENT OFFICE.

ALEXANDER ANDERSON, OF LONDON, ENGLAND.

AUTOMATIC RELIEF-VALVE.

SPECIFICATION forming part of Letters Patent No. 764,877, dated July 12, 1904.

Application filed April 1, 1904. Serial No. 201,162. (No model.)

*To all whom it may concern:*

Be it known that I, ALEXANDER ANDERSON, engineer, a subject of the King of England, residing at 54 Altenburg Gardens, Clapham Common, London, England, have invented a certain new and useful Improvement in Automatic Relief-Valves, of which the following is a full, clear, and exact description, and for which I have applied for Letters Patent in England, dated December 17, 1903.

This invention relates to automatic relief-valves for exhaust-steam and the like.

The invention is especially designed for use with condensing plant, feed-water heaters, steam-heated radiating apparatus, and the like.

The invention consists, essentially, in so constructing the valve that it is closed by a spring, of which the tension may be varied, and in providing the valve with a dash-pot device to prevent hammering of the valve on its seat.

In the simplest form of the invention the valve is attached by means of an arrangement of link and levers to a spindle on which is coiled a spiral spring. One end of this spring is attached to the spindle, and the other end is secured to a wheel or lever-arm. By rotating or altering the position of the wheel or lever the spring is coiled or uncoiled, the force with which the valve is held on or off its seat being thereby varied. The tensioning of the spring may be effected in various ways.

The following description of the invention is given with reference to the accompanying drawings, in which—

Figure 1:
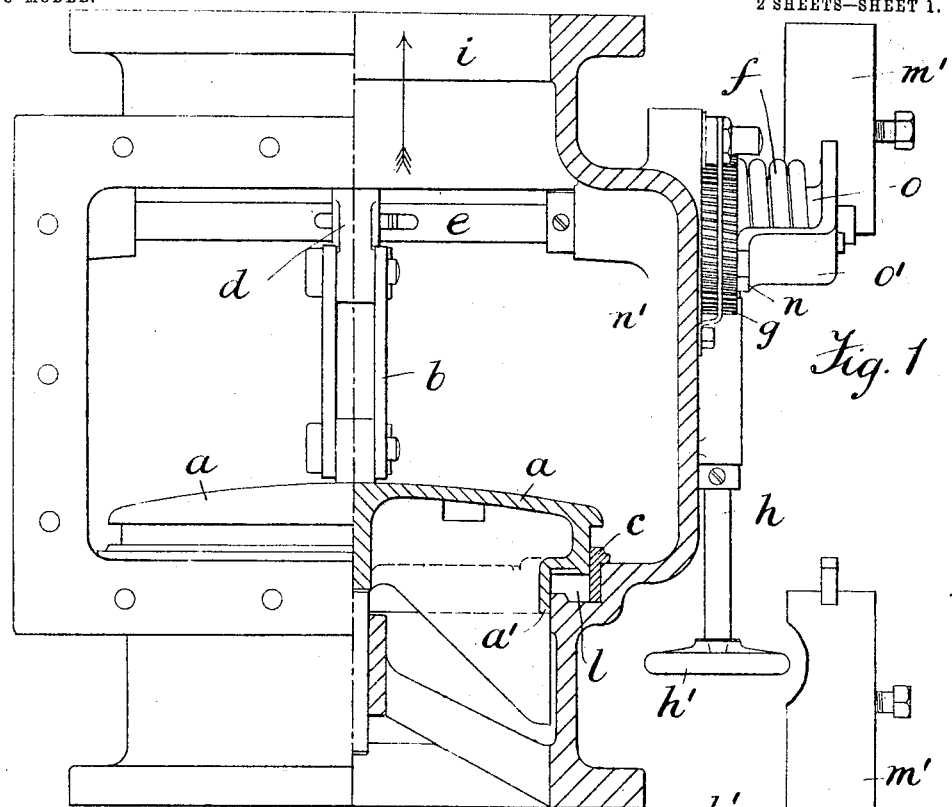
Figure 2:
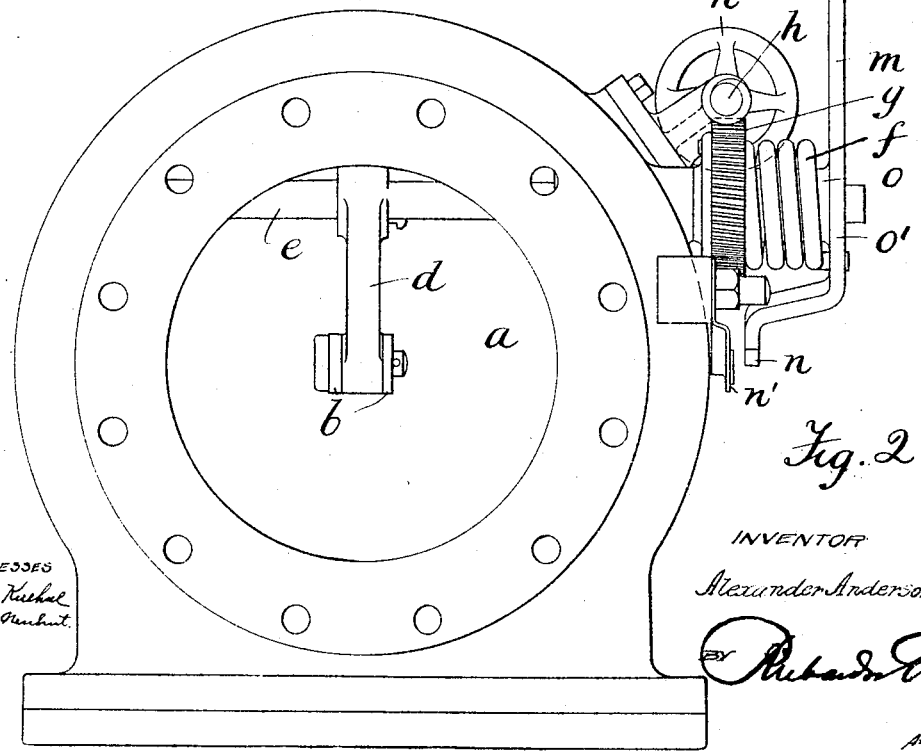

Figure 1 is an elevation, part section, of the valve. Fig. 2 is a plan of the same. Fig. 3 is a side elevation at right angles to Fig. 1. Fig. 4 is a section, on a larger scale, of a modification. Fig. 5 is a part section of a modified form of cushion or dash-pot.

The valve $a$ is suspended from a link $b$ and is adapted to close upon the seat $c$. This valve moves freely, but is vacuum-tight when on its seat. The link $b$ is hinged to a lever-arm $d$, secured upon a spindle $e$. Around this spindle is coiled a spiral spring $f$, one end of which is secured to the spindle and the other end to a lever or other device, whereby the tension of the spring $f$ can be altered.

In the example illustrated the spindle is provided with a sleeve or boss $o$, keyed thereto and having a flange or arm $o'$, to which one end of the spring $f$ is attached. I have also shown a worm-wheel $g$ mounted loosely on the spindle $e$, the other end of the coiled spring being secured to this wheel $g$. A worm mounted on a shaft $h$ engages the worm-wheel $g$, and shaft $h$ can be rotated by means of a hand-wheel $h'$, so that the spring $f$ can be coiled or uncoiled.

The valve $a$ remains on its seat $c$ as long as a vacuum is maintained upon the inlet side of the valve; but as soon as the exhaust increases in pressure the valve lifts and the exhaust escapes to the atmosphere through the outlet $i$ in the usual manner of relief-valves.

To avoid a hammering action of the valve on its seat, I provide an annular space $l$ in the valve-seat. When steam or other fluid is being passed, the valve $a$ is lifted out of this space $l$; but as the valve closes the aforesaid annular space is sealed and acts as a cushion or dash-pot, thus damping the vibrations of the valve. The valve $a$ at its periphery is provided with a lip $a'$, which acts as a guide for the valve and at the same time seals the annular chamber $l$. This arrangement of cushion is advantageous in saving wear on the faces of the valve and its seating and preventing a chattering noise.

In the modification illustrated in Fig. 4 the boss $o$ is shown keyed to the spindle $e$ by means of a feather $e'$. The spindle $e$ is bored longitudinally and screw-threaded to receive an adjusting-screw $p$, having a collar $p'$. A second feather $r$, having a slotted head, is engaged by this collar $p'$, so that as the screw $p$ is rotated the feather $r$ is moved longitudinally. The boss of the worm-wheel $g$ is provided with slots $g'$ at intervals to receive the head $r'$ of the key $r$, so that the worm-wheel can be rigidly keyed to the spindle in any required position and the parts maintained in the relative positions to which they are set. This device may be arranged for positively opening or closing the valve from the hand-wheel without the intervention of the coiled spring, if required.

This valve may be used in connection with exhaust-heaters and will automatically regulate the amount of exhaust-steam passed through the heater, any excess being allowed to pass direct to the atmosphere.

To the boss $o$, keyed upon the spindle $e$, is fixed a lever $m$, having at one end an adjustable weight $m'$ and at the other a pointer $n$. The latter marks on a scale $n'$ the position of the valve—such as "Shut," "Opening," or "Full open." Spring $f$ may be attached either directly to the spindle $e$ or indirectly thereto by being secured to the lever-arm $m$, keyed on the spindle. The lever-arm $m$ may be formed as an extension of the flange $o'$, as clearly shown in Fig. 4.

In the modified arrangement shown in Fig. 5 it will be noticed the cushion-chamber $l$ communicates with the outlet side of the valve during the commencement of the closing movement of the valve. The seating $c$ is here arranged upon the inner periphery of the chamber $l$.

Having thus described my invention, what I claim as such, and desire to secure by Letters Patent, is—

1. An automatic relief-valve and the like, comprising a valve, a lever-arm from which said valve is suspended, a revoluble spindle to which said lever-arm is attached, a coiled spring mounted upon said spindle, a movable device mounted freely on said spindle and rotatable upon said spindle, one end of said coiled spring being secured to said spindle and the other end of said spring secured to said movable device, so that the spring may be coiled or uncoiled.

2. An automatic relief-valve and the like, comprising a valve, a lever-arm from which said valve is suspended, a revoluble spindle to which said lever-arm is attached, a coiled spring mounted upon said spindle, means for securing one end of said spring to said spindle, a worm-wheel mounted loosely on said spindle, means for securing the other end of said spring to said worm-wheel, and an operating-worm which engages said worm-wheel.

3. An automatic relief-valve and the like, comprising a valve, a valve-body having a seating for said valve, a lever-arm from which said valve is suspended, a revoluble spindle to which said lever-arm is attached, said spindle being mounted in said valve-body, a coiled spring mounted upon said spindle, a worm-wheel mounted loosely upon said spindle, means for securing the respective ends of said coiled spring to said spindle and to said worm-wheel, a worm engaging said worm-wheel and mounted upon said valve-body, and a rotatable handle secured to said worm.

4. An automatic relief-valve and the like, comprising a valve, a valve-body having a seating for said valve, a revoluble spindle mounted in said valve-body, means for raising and lowering said valve, said means being operated by said spindle, a worm-wheel mounted loosely upon said spindle, a spring coiled upon said spindle, a lever-arm keyed upon the end of said spindle, said lever-arm having an adjustable weight and a pointer, a scale upon said valve-body corresponding with said pointer, said coiled spring being secured at its ends to respectively the said worm-wheel and said weighted lever-arm.

5. In automatic relief-valves or the like, the combination with a revoluble spindle having a lever-arm from which the valve is suspended, of a wheel rotatable on said spindle, a second lever-arm fixed to said spindle and having a counterweight and an indicator, and of a coiled spring upon said spindle interposed between and secured to said wheel and said second lever-arm.

6. An automatic relief-valve or the like, comprising a valve, a valve-body, a revoluble spindle mounted in said body, a lever-arm attached to said spindle and from which said valve is suspended, a coiled spring upon said spindle whereby the force with which the valve is held on or off its seat may be regulated, a dash-pot chamber in the valve-seat with which the periphery of the valve engages and a lip to said valve.

7. An automatic relief-valve and the like, comprising a valve, a valve-body and a seat for said valve, a lever-arm from which said valve is suspended, a revoluble spindle to which said lever-arm is attached, a coiled spring mounted on said spindle, a wheel mounted freely on said spindle, slots in said wheel, one end of said spring being secured to said wheel and the other end made fast to the spindle, a screw threaded into the revoluble spindle, a collar to said screw, a keyway in said spindle, a double-headed key sliding in said keyway, one of said heads being engaged by said collar and the other head capable of entering said slots in said wheel.

8. An automatic relief-valve and the like comprising a valve, an annular lip to said valve, a valve-body having a valve-seating, an annular chamber in said seating, a lever-arm from which said valve is suspended, a revoluble spindle to which said lever-arm is attached, a coiled spring mounted on said spindle, a worm-wheel mounted freely on said spindle, radial slots in the inner portion of said wheel, a worm engaging said worm-wheel and having an operating-handle, a second lever-arm made fast to said spindle, this second arm having a counterweight and an indicator, said coiled spring secured at its ends to respectively said worm-wheel and said second lever-arm, a screw threaded into said revoluble spindle, a collar to said screw, a keyway in said spindle, a double-headed key sliding in said keyway, one of said heads being engaged by said collar and the other head capable of entering said radial slots in the worm-wheel.

9. An automatic relief-valve and the like, comprising a valve, an annular lip to said valve, said lip of less diameter than the valve, a valve-body, a seat in said valve-body, an annular chamber in said valve-seat, a seating upon the inner edge of said chamber, a lever-arm attached to a revoluble spindle from which said valve is suspended, a wheel loose upon said spindle and a coiled spring mounted around said spindle and made fast to said wheel and said spindle whereby the force with which the valve is held off its seat may be regulated.

In witness whereof I have hereunto set my hand in presence of two witnesses.

ALEXANDER ANDERSON.

Witnesses:
VICTOR F. FEENY,
GEO. W. WHITSON.